United States Patent
Gerber et al.

(10) Patent No.: US 9,163,112 B2
(45) Date of Patent: Oct. 20, 2015

(54) REACTIVE POLYMER CATALYSTS FOR 2-COMPONENT EPOXY RESIN SYSTEMS

(71) Applicant: SIKA TECHNOLOGY AG, Baar (CH)

(72) Inventors: Ulrich Gerber, Uitikon-Waldegg (CH); Jürgen Finter, Freiburg (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/382,236

(22) PCT Filed: Mar. 14, 2013

(86) PCT No.: PCT/EP2013/055281
§ 371 (c)(1),
(2) Date: Aug. 29, 2014

(87) PCT Pub. No.: WO2013/135839
PCT Pub. Date: Sep. 19, 2013

(65) Prior Publication Data
US 2015/0018500 A1    Jan. 15, 2015

(30) Foreign Application Priority Data
Mar. 14, 2012 (EP) .................................. 12159490

(51) Int. Cl.
| | | |
|---|---|---|
| *C08G 59/62* | (2006.01) | |
| *C08G 59/50* | (2006.01) | |
| *C09D 163/00* | (2006.01) | |
| *C09J 163/00* | (2006.01) | |
| *C08L 63/00* | (2006.01) | |
| *C08G 73/02* | (2006.01) | |
| *C08G 63/02* | (2006.01) | |
| *C08L 79/02* | (2006.01) | |

(52) U.S. Cl.
CPC .............. *C08G 59/623* (2013.01); *C08G 59/50* (2013.01); *C08G 59/621* (2013.01); *C08G 73/024* (2013.01); *C08L 63/00* (2013.01); *C09D 163/00* (2013.01); *C09J 163/00* (2013.01); *C08L 79/02* (2013.01)

(58) Field of Classification Search
CPC . C08G 59/623; C08G 73/024; C08G 65/4006
USPC .......... 502/167, 523; 560/8, 25, 37, 129, 252; 528/211; 564/346
See application file for complete search history.

(56) References Cited

U.S. PATENT DOCUMENTS

| | | | | |
|---|---|---|---|---|
| 4,259,464 A | * | 3/1981 | Buriks et al. .................. | 525/480 |
| 6,916,550 B2 | | 7/2005 | Ress, Jr. et al. | |
| 2003/0187155 A1 | | 10/2003 | Schile | |

FOREIGN PATENT DOCUMENTS

| | | |
|---|---|---|
| EP | 0 253 339 A2 | 1/1988 |
| EP | 0 292 701 A2 | 11/1988 |
| EP | 1 475 411 A1 | 11/2004 |
| EP | 1 475 412 A1 | 11/2004 |
| EP | 1 717 253 A1 | 11/2006 |
| WO | WO 00/15687 A1 | 3/2000 |
| WO | WO 02/42349 A2 | 5/2002 |

OTHER PUBLICATIONS

International Preliminary Report on Patentability issued in International Patent Application No. PCT/EP2013/055281 dated Sep. 16, 2014 (with translation).
Apr. 23, 2013 International Search Report issued in International Application No. PCT/EP2013/055281.

* cited by examiner

*Primary Examiner* — Terressa Boykin
(74) *Attorney, Agent, or Firm* — Oliff PLC

(57) ABSTRACT

An oligomeric condensation product can be obtained from at least one (hydroxymethyl)phenol of general formula (I),

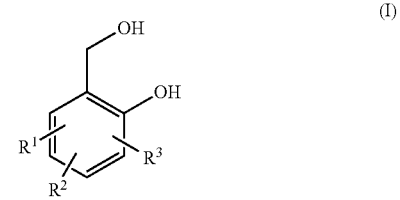

in which $R^1$ is hydrogen or —$CH_3$, $R^2$ is —$CH_2OH$, and $R^3$ is hydrogen or —$CH_3$, at least one polyamine, and optionally at least one phenol compound having two centers reactive by means of a reaction with the methylol groups of the (hydroxymethyl)phenol.

18 Claims, No Drawings

REACTIVE POLYMER CATALYSTS FOR 2-COMPONENT EPOXY RESIN SYSTEMS

The present invention relates to novel mannich-type condensation products and to a new method of production thereof. A further subject matter of the present invention is the use of these condensation products as accelerators in the curing of epoxy resin systems.

PRIOR ART

An epoxy resin consists of polyether polymers which, when suitable curing agents are added, and depending on the reaction that is run, produce a duroplastic plastic of high strength and high chemical resistance. When epoxy resin is mixed with curing agents, the originally viscous mixture will generally be cured within a few minutes to several hours, depending on composition and temperature. Various systems are commercially available as curing agents for epoxy resins, for example curing agents that have an amine-, amide- or anhydride base (under the trade name Epikure® from Hexion Specialty Chemicals, for example) or curing agents that have a polyether amine base (under the trade name Jeffamine® from Huntsman, for example).

Mannich bases from primary amines, formaldehyde and phenols can also be used as curing agents and/or accelerators (cf. EP 0 253 339 A).

WO 00/15687 describes a mannich base accelerator which is produced by transamination of a mannich base with an amine.

One disadvantage of conventional mannich bases is the use of phenol as a starting material, as these mannich bases frequently contain fractions of unreacted phenol. Thus, due to the toxicity of free phenol, phenol-based mannich bases are unsuitable for use in many applications.

A further disadvantage of using conventional mannich bases is that they must be produced using formaldehyde. Formaldehyde is believed to cause allergic reactions and skin, respiratory and eye irritations, among other things. Thus a demand exists for mannich-type condensation products that can be produced without formaldehyde.

One approach that avoids the use of formaldehyde is described in U.S. Pat. No. 6,916,550, which starts with 2,4,6-tris(dimethylaminomethyl)phenol, which is made to react with diamines, particularly with polyoxyalkylene diamines, splitting off dimethylamine. However, this method has the disadvantage that the dimethylamine that is produced is also toxic (TLV value 2 ppm). Therefore, the release of harmful emissions also cannot be prevented according to this approach.

Moreover, the prior art methods for producing mannich bases are highly costly and complex, particularly if the formation of high-molecular condensation products must be avoided. For instance, EP 1 475 411 discloses a two-stage method for producing mannich bases based on m-cresol or 3,5-xylenol and polyamines, in which a tertiary amine is preferably used. EP 1 475 412 A likewise discloses a two-stage method for producing mannich bases, wherein these bases are obtained from phenols, such as m-cresol, 3,5-xylenol or resorcinol, with polyamines, preferably using tertiary amines. Two-stage methods of this type are associated with considerable expense and increase the cost of producing the mannich bases.

EP 0 292 701 further describes reaction products of guayule resins with polyether diamines and 2,6-bis(hydroxymethyl)-p-cresol. To produce these reaction products, the guayule resin constituents are used in significantly larger quantities than the polyether diamine and the 2,6-bis(hydroxymethyl)-p-cresol, resulting in a mixture of reaction products from the amine-terminated polyethers with the guayule resin on one hand and the reaction product of the 2,6-bis(hydroxymethyl)-p-cresol with guayule resin on the other hand. These reaction products are proposed as additives for rubber products.

US 2003/0187155 A1 describes epoxy curing agent systems for curing at low temperatures. The curing agent systems involve complexes of 2,6-bis-(hydroxymethyl)-p-cresol, tetramethylguanidine and trimethylol propane, for example, in which no covalent bonds exist between the individual constituents.

WO 02/42349 A2 likewise describes curing agents for epoxy compositions which can consist of mixtures of amines and polyphenols. The examples of said document describe, for example, a combination of 2,6-bis(hydroxymethyl)-p-cresol and tetramethylguanidine in the form of a complex. These are molecular complexes of the stated constituents, as in US 2003/0187155 A1.

According to an alternative approach, phenolic starting products can be resorcinols such as those described in EP 717 253 A1, which, when reacted with formaldehyde and polyamines, produce low molecular weight mannich bases for use in curing epoxy compositions.

In light of this prior art, the object of the present invention is to provide alternative accelerators for epoxy resins or curing agents for epoxy resins and polyurethanes which ideally avoid the above-described disadvantages. More particularly, the object of the present invention is to provide accelerators for epoxy resins or curing agents for epoxy resins and polyurethanes which contain no free phenol, and in the production of which ideally neither formaldehyde nor other toxic substances, such as dimethylamine, are released. The object is therefore to avoid the use of phenols and formaldehyde and of starting materials which, when reacted with a polyamine, release toxic amines, such as dimethylamine, in the production of corresponding accelerators.

DESCRIPTION OF THE INVENTION

These objects are attained by an oligomeric condensation product, which can be produced from at least one (hydroxymethyl)phenol of general formula (I)

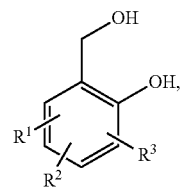

in which $R^1$ is hydrogen or —$CH_3$, $R^2$ is —$CH_2OH$, and $R^3$ is hydrogen or —$CH_3$, at least one polyamine and optionally at least one phenolic compound with two centers that are reactive in terms of a reaction with the methylol groups of the (hydroxymethyl)phenol.

The oligomeric condensation products according to the invention are suitable for use as accelerators for epoxy resin systems and as curing agents for epoxy resin systems, in particular, in the form of two-component epoxy resin systems, and polyurethanes. With these, faster curing times with comparable pot life can be achieved in two-component epoxy adhesives than with comparable prior art curing agents. As a result, manufacturing times can be shortened, opening up new fields of application in which adhesive bonding can be used in place of threaded connections or riveting.

The oligomeric condensation products according to the invention are particularly suitable for accelerating the curing of epoxy resin adhesives and for improving the adhesion of epoxy resin adhesives and/or the shear strength of epoxy resin adhesives, wherein, due to the use of special phenol and amine components, the disadvantages known in the prior art are substantially avoided. In particular, the oligomeric condensation products according to the invention contain no residues of phenol, formaldehyde or other toxic substances, such as dimethylamine.

The oligomeric condensation products according to the invention can be obtained from readily accessible and inexpensive raw materials through a simple production method, which will be described in detail below, and which likewise is a subject of the invention. The oligomeric condensation products according to the invention are characterized in particular by an excellent curing behavior of epoxy resin adhesives.

As was mentioned above, the present invention relates to an oligomeric condensation product which can be produced from at least one (di-hydroxymethyl)phenol according to general formula (I), at least one polyamine and optionally at least one phenolic compound with two centers that react in terms of a reaction with the methylol groups of the (di-hydroxymethyl)phenol.

Within the context of the present invention, a (hydroxymethyl)phenol is understood as a phenol which bears at least one methylol substituent in the ortho-, meta- or para position to the phenolic OH group. Phenols of this type are commercially available. Preferred (hydroxymethyl)phenols are those in which $R^2$ is in the ortho-position to the phenolic OH group in formula (I). In an alternative preferred embodiment, the (hydroxymethyl)phenol of general formula (I) has at least one additional $CH_3$ group as substituent $R^1$ or $R^2$. Preferred (hydroxymethyl)phenols are 2,6-di(hydroxymethyl)-4-methyl-phenol and 2,4-di(hydroxymethyl)-6-methyl-phenol. For reasons of cost, the use of 2,6-di(hydroxymethyl)-4-methyl-phenol is particularly preferred.

Furthermore, within the scope of the present invention, to produce the oligomeric condensation products according to the invention, additional (hydroxymethyl)phenols, such as 2-(hydroxymethyl)phenol, 3-(hydroxymethyl)phenol or 4-(hydroxymethyl)phenol may also be added, however, these should make up no more than 50 mol %, in particular no more than 20 mol % and particularly preferably no more than 10 mol % of the total volume of (hydroxymethyl)phenols. The selection and composition of the (hydroxymethyl)phenols used has a substantial impact on the properties of the resulting oligomeric condensation products and therefore on the epoxy systems that result from the use of these oligomeric condensation products as curing agents and/or accelerators.

The second constituent of the condensation product is a polyamine. The polyamine can be an aliphatic polyamine, such as ethylenediamine (EDA), diethylenetriamine (DETA), triethylenetetramine (TETA), hexamethylenediamine (HMDA), N-(2-aminoethyl)-1,3-propanediamine, N,N'-1,2-ethanediylbis-1,3-propanediamine or dipropylenetriamine, an arylaliphatic polyamine, such as m-xylenediamine (mXDA) or p-xylenediamine, a cycloaliphatic polyamine, such as 1,3-bisaminocyclohexylamine (1,3-BAC), isophorone diamine (IPDA) or 4,4'-methylenebiscyclohexanamine, an aromatic polyamine, such as m-phenyldiamine, diaminodiphenylmethane (DDM) or diaminodiphenylsulphone (DDS), a heterocyclic polyamine, such as N-aminoethylpiperazine (NAEP) or 3,9-bis(3-aminopropyl)-2,4,8,10-tetraoxaspiro(5,5)undecane, a polyalkoxy polyamine, in which the alkoxy group can be an oxyethylene-, oxypropylene-, oxy-1,2 butylene-, or oxy-1,4 butylene group, or a copolymer thereof, such as 4,7-dioxa-1,10-decanediamine (Jeffamin EDR 176) or 4,7,10-trioxan-1,13-tridecanediamine, 4,7,10-trioxa-1,13-tridecanediamine (ANCAMINE 1922A), alpha-(2-aminomethylethyl)-omega-(2-aminomethylethoxy)-poly(oxypropylene) (JEFFAMINE D 230, D-400), triethylene glycol diamine and oligomers thereof (JEFFAMINE XTJ-504, JEFFAMINE XTJ-512), bis(alpha,omega-(aminomethylethoxy)-polyoxypropylene/co-polyoxyethylene (JEFFAMINE XTJ-511), bis-(3-aminopropyl)polytetrahydrofuran 350, bis-(3-aminopropyl)polytetrahydrofuran 750, poly(oxy(methyl-1,2-ethanediyl)), 2-aminopropane terminated polyether with a propylene oxide base and 1,1,1-trimethylolpropane (3:1) (JEFFAMINE T-403), and diaminopropyl dipropylene glycol.

Preferred polyamines are polyamines such as diethylenetriamine (DETA), triethylenetetramine (TETA), 1,3-bisaminocyclohexylamine (1,3-BAC), isophorone diamine (IPDA), N-aminoethylpiperazine (NAEP), 4,7-dioxadecane-1,10-diamine, 4,9-dioxadodecane-1,12-diamine, 4,7,10-trioxa-1,13-tridecanediamine (ANCAMINE 1922A), JEFFAMINE D 230, JEFFAMINE D-400, JEFFAMINE XTJ-504, and JEFFAMINE XTJ-511.

In one preferred embodiment, the diamine is a polyoxyalkylene diamine, which particularly preferably contains units based on ethylene oxide, oxetane, tetrahydrofuran or a mixture of two or more of these components. In particular, the polyoxyalkylene diamine is preferably a polyoxyalkylene diamine of general formula II in which x1 and x2 independently stand for a value of 0 to 70, in particular, a value of 1 to 10. Such polyamines have the advantage of high molecular weight and low viscosity.

(II)

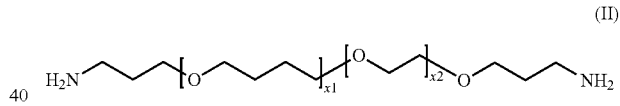

It is further preferable for the diamine to have a molecular weight ranging from 130 to 500 g/mol. This offers the advantage that the end product is not overly viscous.

The optional constituent is a phenolic compound having two reactive centers in terms of a reaction with the methylol groups of the (hydroxymethyl)phenol. Within the context of the present invention, these reactive centers are understood to be parts of the phenolic compound which are capable of reacting, splitting off hydrogen and the hydroxy group of the (hydroxymethyl)phenol (i.e. condensation as the overall reaction). They are therefore substituted carbon atoms of the phenolic compound, which are integrated into the aromatic ring. These phenolic compounds are preferably resorcinol and/or resorcinol derivatives, bisphenol A or derivatives thereof.

The resorcinol derivative to be used in the oligomeric condensation product (I) according to the invention is preferably an alkylated resorcinol, which can contain one or two additional alkyl groups. It is preferably a monoalkylated resorcinol. Although the present invention has no relevant restrictions with respect to the substituents on the resorcinol, it is preferable for at least one substituent on the resorcinol to be a C1-C12' alkyl group, in particular a C1-C8 alkyl group. Particularly preferred resorcinol derivatives for use in the oligomeric condensation product are 2-methylresorcinol, 4-butylresorcinol and 4-hexylresorcinol. These resorcinol derivatives have the advantage that they also increase the concentration of phenolic, catalytically active hydroxyl.

Bisphenol derivatives to be used in the oligomeric condensation product (I) according to the invention are particularly 3,3'-diallyl-4,4'-bisphenol A, 3,3'-dimethyl-4,4'-bisphenol A, dimethylbisphenol P or mixtures thereof. The use of 3,3'-diallyl-4,4'-bisphenol A is particularly preferred.

Oligomeric condensation products that contain a proportion of additional phenolic compound have a particularly strong catalytic effect due to the high concentration of phenolic groups, and are therefore preferred over oligomeric condensation products that contain no resorcinol within the scope of this invention.

The condensation product according to the invention is an oligomeric condensation product.

In contrast to an oligomeric condensation product, a monomeric condensation product is understood as a product that contains only compounds that have a single polyamine unit and/or a single hydroxymethyl phenol unit. Therefore, oligomeric condensation products also contain compounds that have at least two hydroxymethyl phenol units and at least two polyamine units. Preferred oligomeric condensation products have an average number of at least 1.5 hydroxymethyl phenol units and at least 1.5 polyamine units, in particular at least two hydroxymethyl phenol units and at least two polyamine units, and particularly preferably at least 2.5 hydroxymethyl phenol units and at least 2.5 polyamine units.

The oligomeric condensation products according to the invention contain oligomeric compounds having a number of hydroxymethyl phenol units ranging from 1 to 5, preferably 1 to 3, and a number of diamines ranging from 2 to 6, in particular, 2 to 4. If the oligomeric condensation product also comprises units of the phenolic compound, the oligomeric condensation product will contain compounds having a number of units of the optional phenolic compound ranging from 1 to 5, preferably 1 to 3, and a number of diamines ranging from 2 to 6, in particular, 2 to 4. For each unit of the phenolic compound, the compounds in such a condensation product contain two (hydroxymethyl)phenol units, so that the number thereof in the compounds is twice as high as that of the units of the phenolic compound.

The oligomeric condensation products according to the invention comprising (hydroxymethyl)phenols and polyamines can be produced from the above-described phenolic compounds and polyamines by condensation reaction. These condensation products can be produced by routine condensation methods; however, the condensation products are preferably produced according to the method described in the following.

Thus a further aspect of the present invention is a novel method for producing condensation products according to the invention. This method is characterized in that at least one (hydroxymethyl)phenol as described above is reacted with at least one polyamine and optionally at least one phenolic compound having two reactive centers in terms of a reaction with the methylol groups of the (hydroxymethyl)phenol, to form an oligomeric condensation product.

A (hydroxymethyl)phenol compound as described above can be used as the (hydroxymethyl)phenol. A polyamine compound as described above can be used as the polyamine. Finally, a phenolic compound as described above can be used as the optional phenolic compound. In this regard, reference is made to the above description.

In a preferred embodiment, the method according to the invention comprises the following method steps:
(i) optionally placing at least one (hydroxymethyl)phenol according to the above definition and at least one phenolic compound having two reactive centers in terms of a reaction with the methylol groups of the (hydroxymethyl)phenol at a temperature of 15 to 100° C., preferably 20 to 90° C., particularly preferably 20 to 70° C., in a reaction vessel, and then increasing the temperature to 120 to 190° C., preferably to 120 to 180° C., particularly preferably to 120 to 170° C.,
(ii) placing at least one (hydroxymethyl)phenol or the reaction product from (i) and at least one polyamine at a temperature of 15 to 100° C., preferably 20 to 90° C., particularly preferably 20 to 70° C. in a reaction vessel;
(iii) increasing the temperature to 130 to 210° C., preferably to 140 to 200° C., particularly preferably to 150 to 195° C.

The reaction in the method according to the invention, in particular, in above-described method step (i) with regard to the subsequent increase in temperature, is preferably carried out for a period of 0.5 to 10, preferably 1 to 8 hours, and particularly preferably 1 to 5 hours.

It is further preferred for the method according to the invention to be carried out under inert conditions, particularly in the presence of an inert gas and with the exclusion of oxygen. This has the advantage of protecting the sensitive amines against secondary reactions.

It has proven expedient for the at least one (hydroxymethyl)phenol or the reaction product of the (hydroxymethyl)phenol with the phenolic compound to be reacted with the at least one polyamine in a molar ratio of 3:1 to 1:5, preferably 1:2 to 1:4, and particularly preferably 1:2 to 1:3.

The present invention further relates to an oligomeric condensation product that is obtainable by the above-described method.

The oligomeric condensation product according to the invention is suitable particularly as a curing agent for amine-reactive substances which have at least two amine-reactive functional groups. Possible amine-reactive functional groups of this type include particularly glycidyl ether groups and/or isocyanate groups.

In one embodiment of the present invention, the amine-reactive substance, which has at least two amine-reactive functional groups, is a diglycidyl ether. In particular, the substance is a diglycidyl ether of bisphenol A, bisphenol F or bisphenol A/F. Such diglycidyl ethers are available, for example, as Araldite® GY 250, GY 282 (Huntsman) or D.E.R.™ 331 or D.E.R.™ 330 (Dow) or Epikote 828 (Hexion).

Mixing the amine-reactive substance, which has at least two amine-reactive functional groups, with the oligomeric condensation product according to the invention causes the amine groups of the oligomeric condensation product to react with the amine-reactive functional groups of the amine-reactive substance, resulting in curing.

The present invention therefore relates particularly to the use of at least one oligomeric condensation product according to the invention or at least one oligomeric condensation product obtainable by the above-described method in epoxy resin systems, for example, in epoxy resin adhesives and in coatings having an epoxy resin base.

In particular, the oligomeric condensation products according to the invention are used to accelerate the curing of epoxy resin adhesives, to improve the adhesion of epoxy resin adhesives and/or the peel-resistance of epoxy resin adhesives.

The oligomeric condensation product according to the invention can be used as such or in a compound.

The oligomeric condensation products according to the invention and the oligomeric condensation products according to the invention that result from the method according to the invention can be used particularly in curing agent components of two-component epoxy systems. The identified oligomeric condensation products can be used herein directly or as constituents of the curing agent component.

The oligomeric condensation products according to the invention are particularly preferably used as curing agents in two-component epoxy resin adhesives. The two-component epoxy systems that are cured therewith and the products that are obtained therefrom have highly advantageous properties, particularly for rapid, accelerated curing and cold curing.

When the condensation product according to the invention is used for curing amine-reactive systems, the present invention also relates to a two-component composition which contains a first component K1 and a second component K2. The first component K1 comprises at least one amine-reactive compound having at least two functional groups, which are capable of reacting with amines. The second component K2 comprises at least one oligomeric condensation product according to the invention. Amine-reactive compounds which contain at least two functional groups that are capable of reacting with amines have already been described above and comprise particularly diepoxides.

Both components K1 and K2 can comprise additional constituents that are known to a person skilled in the art. Such additional constituents include particularly filler materials, softening agents, solvents catalysts and/or additives.

Suitable filler materials include particularly carbon black, chalks, particularly coated chalks, sands, silicates, lightweight filler materials, such as ceramic or glass balls, particularly hollow ceramic or glass balls, pyrogenic silicic acids and fly ash, and mixtures thereof.

Preferred solvents are solvents that are not classified as VOC ("volatile organic compounds"). Hydrocarbons having high boiling points, such as polyethylbenzenes (Solvesso 200; CAS 64742-94-5) or alkylated naphthalene, are particularly preferred.

Preferred softeners are phthalates and adipates, particularly diisodecyl phthalate (DIDP) and dioctyl adipate (DOA).

The described two-component compositions can be used in various fields of application. The use thereof as an adhesive material or sealing material, in particular as a structural adhesive, is preferred. The properties that can be achieved using the condensation products according to the invention have been found to be particularly advantageous in the field of adhesives.

Once components K1 and K2 of the described two-component composition have been mixed, the adhesive is applied to a substrate surface and is placed in intimate contact with another substrate surface. The cured composition acts as an adhesive layer, which is capable of transferring forces between the two substrate surfaces of the laminated body that is formed.

The properties of the two-component composition make it expediently suitable for use as a structural adhesive in building construction and civil engineering, and in industrial applications. For example, a two-component composition of this type, particularly a two-component epoxy resin composition, i.e., in which component K1 comprises a diglycidyl ether, can be used as an adhesive for gluing fiber-reinforced composites. One example of this involves gluing carbon fiber lamella together to reinforce structures, such as bridges.

Two-component compositions according to the invention, in particular, a two-component epoxy resin composition, can also be used as a plastic matrix for producing fiber-reinforced composites. For example, carbon or glass fibers can be embedded in a two-component composition, and can be used in the cured state as a fiber composite, for example, in the form of a lamella.

Similarly, fiber fabric or batting, for example, can be applied using a two-component composition, particularly a two-component epoxy resin composition, to a building structure, forming a fiber-reinforced composite together with the structure.

The viscosity of the oligomeric condensation products according to the invention is heavily dependent on the phenolic compound that is used and on the polyamine that is used. Particularly suitable oligomeric condensation products according to the invention have a viscosity at 25° C. of less than 10000 mPas, ensuring adequate processability. Preferred oligomeric condensation products according to the invention have viscosities ranging from 200 to 7000 mPas.

It is clear to a person skilled in the art that with this type of reaction, unreacted constituents may still be present in small amounts in the end product.

The resulting invention will be specified in greater detail in the following examples.

EXAMPLES

Example 1

A vessel was filled with 180 g (0.88 mol) Jeffamin EDR 176 and 99 g (0.58 mol) 2,6-bis(hydroxymethyl)-p-cresol and heated in a nitrogen atmosphere. Once a homogeneous mixture had been obtained (at approximately 50° C.), the temperature was increased successively to 180° C., wherein steady boiling was observed beyond a temperature of 160° C. In the range of 180 to 178° C., a total of 66 mL of a distillate was obtained. The product was obtained in the form of a viscous, yellowish-clear polymer as residue.

Example 2

90 g 4,7-dioxa-1,10-decanediamine and 60 g 2,6-bis(hydroxymethyl)-p-cresol was placed in a vessel and heated successively to a temperature of 178° C. Within the range of 165° C. to 170° C., a total of 16 mL of a distillate was collected. The product was obtained in the form of a viscous, yellowish-clear polymer as residue.

Example 3

120 g Jeffamin D 230 and 60 g 2,6-bis(hydroxymethyl)-p-cresol was placed in a vessel and heated successively to a temperature of 184° C. At a temperature of 184° C., a total of 12 mL of a distillate was collected. The product was obtained in the form of a viscous, yellowish-clear polymer as residue.

Example 4

120 g (1.18 mol) 4,9-dioxa-1,12-dodecanediamine, 20 g (0.36 mol) resorcinol and 60 g (0.71 mol) 2,6-bis(hydroxymethyl)-p-cresol was placed in a vessel and heated successively to a temperature of 175° C. At this temperature, a total of 8 mL of a distillate was collected. Afterward, a substantial increase in viscosity and gelation was observed. The product was not usable.

Example 5

120 g (1.18 mol) 4,9-dioxa-1,12-dodecanediamine, 10 g (0.18 mol) resorcinol and 70 g (0.83 mol) 2,6-bis(hydroxymethyl)-p-cresol was placed in a vessel and heated successively to a temperature of 173° C. At this temperature, a total of 10 mL of a distillate was collected. Afterward, a substantial increase in viscosity was observed. Once the reaction mixture had cooled, no residual resorcinol monomer could be detected.

Example 6

120 g (1.18 mol) 4,9-dioxa-1,12-dodecanediamine, 20 g (0.35 mol) methyl resorcinol and 60 g (0.71 mol) 2,6-bis (hydroxymethyl)-p-cresol was placed in a vessel and heated successively to a temperature of 173° C. At this temperature, a total of 12 mL of a distillate was collected. Afterward, a substantial increase in viscosity was observed. Once the reaction mixture had cooled, a residual content of only 0.04% methyl resorcinol monomer could be detected.

Example 7

70 g (0.45 mol) diallyl bisphenol A and 80 g (0.95 mol) 2,6-bis(hydroxymethyl)-p-cresol was placed in a vessel and heated to a temperature of 150° C. At this temperature, a total of 16 mL of a distillate was collected. Once the reaction mixture had cooled, analysis showed a residual content of 7.0% diallyl bisphenol A±0.2 and a residual content of 2,6-bis(hydroxymethyl)-p-cresol of 0.6%±0.02.

150 g (1.47 mol) 4,9-dioxa-1,12-dodecanediamine was added to this mixture, and the reaction mixture was heated to 173° C. At a temperature of 158° C., foaming was observed, and at a temperature of 173° C. a total of 10 mL of a distillate was obtained. After cooling, the resulting product showed a residual content of diallyl bisphenol A of only 1.5%±0.1.

Example 8

A vessel was filled with 10 g (0.18 mol) resorcinol, 4,7,10-trioxa-1,13-tridecanediamine and 120 g (1.09 mol) and 70 g (0.83 mol) 2,6-bishydroxymethyl-p-cresol and heated in a nitrogen atmosphere. Once a homogeneous mixture had been obtained (at approximately 120° C.), the temperature was increased successively to 178° C., with constant boiling observed beyond a temperature of 125° C. In the range of 165 to 178° C., a total of 12 mL of a distillate was obtained. The product was obtained in the form of a viscous, clear polymer as residue.

Example 9

A vessel was filled with 25 g (0.44 mol) 2-methyl resorcinol, 115 g (1.05 mol) 4,7,10-trioxa-1,13-tridecanediamine and 60 g (0.71 mol) 2,6-bishydroxymethyl-p-cresol and heated in a nitrogen atmosphere. Once a homogeneous mixture had been obtained (at approximately 110° C.), the temperature was increased successively to 176° C., with constant boiling observed beyond a temperature of 155° C. Within the range of 155 to 176° C., a total of 11 mL of a distillate was obtained. The product was obtained in the form of a viscous polymer as residue and was reddish/light brown in color.

Example 10

50 g (0.88 mol) 2-methyl resorcinol, 50 g pseudocumene as auxiliary solvent and 120 g (1.43 mol) 2,6-bis(hydroxymethyl)-p-cresol was placed in a vessel and heated in a nitrogen atmosphere. At a temperature of 80° C., a flowable material formed, while at a temperature of 120° C., all solids were dissolved. At a temperature of 145° C., the composition began to boil and to foam heavily, wherein from 140 to 145° C. a total of 22 mL of a distillate was obtained. According to GPC analysis, the residue had a Mw of 4850±250 g/mol and a Mn of 1420±100 g/mol.

In a second stage, 230 g (2.09 mol) 4,7,10-trioxa-1,13-tridecanediamine was added to the obtained residue, and the reaction mixture was heated to 150° C. At a temperature of 165 to 185° C. and subsequent establishment of a vacuum, a total of 138 mL of a distillate was obtained. The product (obtained as residue) was reddish/light brown in color and had a residual content of 1-methylresorcinol of <0.05%, of 2,6-dimethylol-p-cresol of 0.03%±0.01 and of pseudocumene of 1.21%±0.03%.

Example 11

50 g (0.876 mol) 2-methyl resorcinol, 60 g ethylene glycol as auxiliary solvent and 100 g (1.19 mol) 2,6-bis(hydroxymethyl)-p-cresol was heated in a vessel with stirring, until at a temperature of 105° C. a full dissolution was obtained. Within a temperature range of 140° C. to 156° C., a total of 20 mL of a distillate was obtained, wherein upon completion of distillation, a substantial increase in viscosity could be detected. Analysis of the material remaining in the vessel showed a 2-methyl resorcinol content of 0.06%±0.01 and a 2,6-dimethylol-p-cresol content of 2.1%±0.1, and a molecular weight distribution according to GPC of Mw=9590±500 g/mol and a Mn of 1860±100 g/mol.

In a second stage, 180 g (1.64 mol) 4,7,10-trioxa-1,13-tridecanediamine was added to the obtained residue, and the reaction mixture was reheated. Beyond a temperature of 147° C., boiling could again be detected and up to a temperature of 180° C., 120 mL of a distillate was obtained. Once a vacuum was established, another 62 mL of a distillate was obtained. The resulting product had a residual ethylene glycol content of 1.59%±0.08.

Example 12

60 g (0.617 mol) 4-hexyl resorcinol, 40 g pseudocumene as auxiliary solvent and 90 g (1.07 mol) 2,6-bis(hydroxymethyl)-p-cresol was heated in a vessel with stirring, until at a temperature of 80° C. complete dissolution resulted. Within a temperature range of 130° C. to 140° C., a total of 22 mL of a distillate was obtained, wherein upon completion of distillation, a substantial increase in viscosity could be detected. Analysis of the material remaining in the vessel showed a 4-hexyl resorcinol content of 2.9%, a 2,6-dimethylol-p-cresol content of 10.5%, and a molecular weight distribution according to GPC of Mw=2370 g/mol±100 and Mn 1130±100.

180 g (1.64 mol) 4,7,10-trioxa-1,13-tridecanediamine was added to this mixture, and the mixture was further heated to 160° C. A total of 202 mL of a distillate was obtained. The product obtained as residue was reddish/light brown in color and had a residual pseudocumene content of 0.26%±0.1%.

The invention claimed is:

1. An oligomeric condensation product that is a condensation product of:
   at least one (hydroxymethyl)phenol of general formula (I):

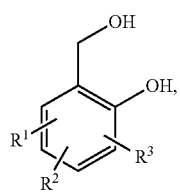

in which
   $R^1$ is hydrogen or —$CH_3$,
   $R^2$ is —$CH_2OH$ and
   $R^3$ is hydrogen or —$CH_3$;
   at least one polyamine; and
   optionally, at least one phenolic compound having two reactive centers in terms of a reaction with the methylol groups of the (hydroxymethyl)phenol.

2. The oligomeric condensation product according to claim 1, wherein $R^2$ is located in the ortho position to the phenolic OH group in formula (I).

3. The oligomeric condensation product according to claim 1, wherein at least one of $R^1$ and $R^3$ is —$CH_3$.

4. The oligomeric condensation product according to claim 1, wherein the at least one polyamine comprises a polyoxyalkylene diamine.

5. The oligomeric condensation product according to claim 1, wherein the at least one polyamine corresponds to general structure (II)

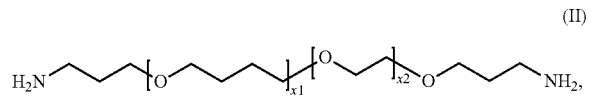

in which x1 and x2 independently stand for a value of 0 to 70.

6. The oligomeric condensation product according to claim 1, wherein the at least one polyamine has a molecular weight of 130 to 500 g/mol.

7. The oligomeric condensation product according to claim 1, wherein the oligomeric condensation product is a condensation product of:
   the at least one (hydroxymethyl)phenol of general formula (I);
   the at least one polyamine; and
   the at least one phenolic compound.

8. A method for producing an oligomeric condensation product according to claim 1, wherein the at least one (hydroxymethyl)phenol is reacted with the at least one polyamine and, optionally, resorcinol, at least one resorcinol derivative, or diallyl bisphenol A.

9. The method according to claim 8, wherein the at least one polyamine comprises a polyoxyalkylene diamine.

10. The method according to claim 8, wherein the at least one (hydroxymethyl)phenol is reacted with diallyl bisphenol A or a resorcinol derivative.

11. The method according to claim 8, comprising the following steps:
    (i) optionally placing at least one (hydroxymethyl)phenol and at least one phenolic compound having two reactive centers in terms of a reaction with the methylol groups of the (hydroxymethyl)phenol at a temperature of 15 to 100° C., in a reaction vessel, and then increasing the temperature to 120 to 190° C.,
    (ii) placing the at least one (hydroxymethyl)phenol or the reaction product from step (i) and at least one polyamine at a temperature of 15 to 100° C., in the reaction vessel, and
    (iii) increasing the temperature to 130 to 210° C.

12. The method according to claim 11, comprising the following steps:
    (i) placing the at least one (hydroxymethyl)phenol and the at least one phenolic compound at a temperature of 15 to 100° C., in the reaction vessel, and then increasing the temperature to 120 to 190° C.;
    (ii) placing the reaction product from step (i) and the at least one polyamine at a temperature of 15 to 100° C., in the reaction vessel; and
    (iii) increasing the temperature to 130 to 210° C.

13. The method according to claim 8, wherein the at least one (hydroxymethyl)phenol or the reaction product of (hydroxymethyl)phenol and the at least one phenolic compound is reacted with the at least one polyamine in a molar ratio of 3:1 to 1:5.

14. A condensation product obtainable by a method according to claim 8.

15. A method comprising:
    curing epoxy resin systems with at least one condensation product according to claim 1.

16. A two-component composition, comprising a first component K1, which comprises at least two functional groups that are capable of reacting with amines, and a second component K2, which comprises at least one condensation product according to claim 1.

17. The oligomeric condensation product according to claim 7, wherein the at least one phenolic compound comprises diallyl bisphenol A or a resorcinol derivative.

18. The method according to claim 12, wherein the temperature increase in step (i) of the method is conducted for a period of 0.5 to 10 hours.

* * * * *